(12) United States Patent
Hosobe

(10) Patent No.: US 9,001,789 B2
(45) Date of Patent: Apr. 7, 2015

(54) COMMUNICATION SYSTEM, IDENTIFIER ASSIGNMENT DEVICE, BASE STATION, IDENTIFIER ASSIGNMENT METHOD, AND NON-TRANSITORY COMPUTER READABLE MEDIUM EMBODYING INSTRUCTIONS FOR CONTROLLING A DEVICE

(71) Applicant: NEC Corporation, Tokyo (JP)

(72) Inventor: Hideumi Hosobe, Tokyo (JP)

(73) Assignee: NEC Corporation, Tokyo (JP)

( * ) Notice: Subject to any disclaimer, the term of this patent is extended or adjusted under 35 U.S.C. 154(b) by 88 days.

(21) Appl. No.: 13/770,338

(22) Filed: Feb. 19, 2013

(65) Prior Publication Data

US 2013/0215870 A1    Aug. 22, 2013

(30) Foreign Application Priority Data

Feb. 17, 2012    (JP) ................. 2012-033095

(51) Int. Cl.
| | |
|---|---|
| *H04W 36/00* | (2009.01) |
| *H04W 36/30* | (2009.01) |
| *H04W 36/06* | (2009.01) |
| *H04W 72/04* | (2009.01) |
| *H04W 24/02* | (2009.01) |

(52) U.S. Cl.
CPC ...... *H04W 36/0061* (2013.01); *H04W 36/0083* (2013.01); *H04W 72/0406* (2013.01); *H04W 24/02* (2013.01)

(58) Field of Classification Search
CPC .............. H04W 36/0083; H04W 36/0072; H04W 36/06; H04W 36/30; H04W 72/0406; H04W 72/042; H04W 84/045; H04W 12/04; H04W 12/06; H04W 16/32; H04W 24/02; H04W 36/0055; H04W 60/06; H04W 76/02
USPC ........................ 370/254–350; 709/201–213
See application file for complete search history.

(56) References Cited

U.S. PATENT DOCUMENTS

| | | | |
|---|---|---|---|
| 8,588,787 B2* | 11/2013 | Murakami et al. ........... | 455/439 |
| 2010/0105395 A1* | 4/2010 | Ji et al. ........................ | 455/444 |
| 2012/0009957 A1 | 1/2012 | Murasawa | |

FOREIGN PATENT DOCUMENTS

EP    2405682 A2    1/2012

(Continued)

OTHER PUBLICATIONS

International Search Report issued May 21, 2013 in PCT/JP2013/000857.

(Continued)

*Primary Examiner* — Ayaz Sheikh
*Assistant Examiner* — Debebe Asefa
(74) *Attorney, Agent, or Firm* — Sughrue Mion, PLLC

(57) ABSTRACT

The communication system includes a first base station that forms a first cell, a second base station that forms a second cell, and an identifier assignment device that assigns an identifier for identifying the second cell, wherein the first base station transmits first neighbor cell information containing identifier information of neighbor cells of the first cell to the second base station, and the second base station transmits the first neighbor cell information received from the first base station to the identifier assignment device.

10 Claims, 16 Drawing Sheets

(56) References Cited

FOREIGN PATENT DOCUMENTS

| | | |
|---|---|---|
| JP | 2010-268463 A | 11/2010 |
| JP | 2010-537479 A | 12/2010 |
| JP | 2011-004377 A | 1/2011 |
| JP | 2012-19468 A | 1/2012 |
| JP | 2013-21450 A | 1/2013 |

OTHER PUBLICATIONS

Nokia Siemens Networks, "Son Use Case: Cell PHY_ID Automated Configuration", 3GPP TSG-RAN WG3 Meeting #59, R3-080376, Sorento, Italy, Feb. 11-15, 2008.

* cited by examiner

| IE/Group Name |
| --- |
| Message Type |
| Global eNB ID |
| Served Cells |
| >Served Cell Information |
| >Neighbour Information |
| >>ECGI |
| >>PCI |
| >>EARFCN |
| GU Group Id List |
| >GU Group Id |

Fig. 8

| IE/Group Name |
|---|
| Message Type |
| Global eNB ID |
| Served Cells |
| >Served Cell Information |
| >Neighbour Information |
| >>ECGI |
| >>PCI |
| >>EARFCN |
| GU Group Id List |
| >GU Group Id |
| Criticality Diagnostics |

Fig. 9

| IE/Group Name |
|---|
| Message Type |
| Served Cells To Add |
| >Served Cell Infomation |
| >Neighbour Information |
| >>ECGI |
| >>PCI |
| >>EARFCN |
| Served Cells To Modify |
| >Old ECGI |
| >Served Cell Infomation |
| >Neighbour Information |
| >>ECGI |
| >>PCI |
| >>EARFCN |
| >Deactivation Indication |
| Served Cells To Delete |
| >Old ECGI |
| GU Group Id To Add List |
| >Gu Group Id |
| GU Group Id To Delete List |
| >Gu Group Id |

Fig. 10

| PCI AND EGCI LIST OF CELL ADJACENT TO CELL ADJACENT TO ADJACENT CELL OF CELL $25_1$ ||
|---|---|
| $EGCI_2$ | $PCI_2$ |
| $EGCI_3$ | $PCI_3$ |
| $EGCI_4$ | $PCI_4$ |
| $EGCI_7$ | $PCI_7$ |
| $EGCI_8$ | $PCI_8$ |
| $EGCI_9$ | $PCI_9$ |
| $EGCI_{10}$ | $PCI_{10}$ |
| $EGCI_{11}$ | $PCI_{11}$ |
| $EGCI_{12}$ | $PCI_{12}$ |

Fig. 15

COMMUNICATION SYSTEM, IDENTIFIER ASSIGNMENT DEVICE, BASE STATION, IDENTIFIER ASSIGNMENT METHOD, AND NON-TRANSITORY COMPUTER READABLE MEDIUM EMBODYING INSTRUCTIONS FOR CONTROLLING A DEVICE

INCORPORATION BY REFERENCE

This application is based upon and claims the benefit of priority from Japanese patent application No. 2012-033095, filed on Feb. 17, 2012, the disclosure of which is incorporated herein in its entirety by reference.

BACKGROUND

The exemplary embodiments relates to a method of assigning an identifier to a cell.

The speed and capacity of communication between servers and backplane boards are increasing today. Accordingly, there is a possibility that the radio environment changes after assigning a PCI (Physical Cell Identifier), which is one type of a cell identifier. Therefore, in PCI assignment, it is necessary to select a PCI that can maintain collision-free and confusion-free even when the radio environment changes.

However, enormous work is required to measure the actual radio environment. Further, detailed information elements such as obstacles are required to estimate the radio environment, and it is difficult to manage such enormous information. Therefore, there is a demand for a communication system in which a PCI that is likely to maintain collision-free and confusion-free can be assigned.

Techniques related to PCT assignment are described in Japanese Unexamined Patent Application Publication No. 2011-004377, Japanese Unexamined Patent Application Publication (Translation of PCT Application) No. 2010-537479, and Japanese Unexamined Patent Application Publication No. 2010-268463.

According to the handover method disclosed in Japanese Unexamined Patent Application Publication No. 2011-004377, a reconnection procedure is executed in the event PCI confusion occurs.

Further, according to the conflict resolution method disclosed in Japanese Unexamined Patent Application Publication (Translation of PCT Application) No. 2010-537479, when a detection node detects that a first cell identifier related to a first conflict cell is the same as a second cell identifier related to a second conflict cell, one of the first and second conflict cells is selected. Then, a different cell identifier is determined for the selected cell.

However, both of the above techniques detect the overlap of an identifier such as a PCI between adjacent cells and then resolve the detected overlap of an identifier. Therefore, it is unable in PCI assignment to select a PCI that can maintain collision-free and confusion-free even when radio environment changes.

A technique related to selection of a PCI in consideration of maintaining collision-free and confusion-free is disclosed in Japanese Unexamined Patent Application Publication No. 2010-268463, for example.

According to the PCI assignment method disclosed in Japanese Unexamined Patent Application Publication No. 2010-268463, a SON (Self-Organizing Network) functional node pieces together information of an adjacent cells reported from each base station under the control thereof. Then, the SON functional node then assigns a PCI to a cell based on the adjacent cell information.

However, in this technique, only identifier information of adjacent cells of a cell formed by a base station connected to the SON functional node is transmitted to the SON functional node. This causes a problem that, when assigning an identifier such as a PCI, the SON functional node can consider the identifier information of adjacent cells of the cell formed by the base station connected to itself but cannot consider the identifier information of cells adjacent to those adjacent cells. As a result, a serious problem occurs that it is difficult to maintain collision-free and confusion-free in the event radio environment changes.

This problem is caused by the fact that there is no way for the SON functional node to know the identifier information of adjacent cells of a cell formed by a base station that is not connected to the SON functional node.

In view of the above problem, an exemplary object of the invention is to provide a communication system in which an identifier assignment device can know identifier information of adjacent cells of a cell formed by a base station that is not connected to the identifier assignment device.

However, exemplary embodiments are not required to achieve here, objectives described above, and an exemplary embodiment may not achieve any of the objectives described above.

In an exemplary aspect of the invention, a communication system includes a first base station that forms a first cell, a second base station that forms a second cell, and an identifier assignment device that assigns an identifier for identifying the second cell, wherein the first base station transmits first adjacent cell information containing identifier information of adjacent cells of the first cell to the second base station, and the second base station transmits the first adjacent cell information received from the first base station to the identifier assignment device.

In an exemplary aspect of the invention, an identifier assignment device in a communication system including a first base station forming a first cell and a second base station forming a second cell, the identifier assignment device assigning an identifier of the second cell, includes a receiving unit that receives first adjacent cell information containing identifier information of adjacent cells of the first cell from the second base station, and an identifier assignment unit that assigns an identifier of the second cell based on the first adjacent cell information received by the receiving unit.

In an exemplary aspect of the invention, a base station in a communication system including a first cell, a second cell, and an identifier assignment device that assigns an identifier of the second cell, the base station forming the second cell, includes a receiving unit that receives first adjacent cell information containing identifier information of adjacent cells of the first cell from another base station forming the first cell, and a transmitting unit that transmits the first adjacent cell information to the identifier assignment device.

In an exemplary aspect of the invention, an identifier assignment method includes a step of transmitting first adjacent cell information containing identifier information of adjacent cells of a first cell formed by a first base station to a second base station that forms a second cell, and a step of transmitting the first adjacent cell information received by the second base station to an identifier assignment device that assigns an identifier of the second cell.

In an exemplary aspect of the invention, a method for an identifier assignment device in a communication system including a first base station forming a first cell and a second base station forming a second cell, the identifier assignment device assigning an identifier of the second cell, includes a receiving step of receiving first adjacent cell information containing identifier information of adjacent cells of the first cell from the second base station, and an identifier assignment step of assigning an identifier of the second cell based on the first adjacent cell information received in the receiving step.

In an exemplary aspect of the invention, a method for a base station in a communication system including a first cell, a second cell, and an identifier assignment device that assigns an identifier of the second cell, the base station forming the second cell, includes a receiving step of receiving first adjacent cell information containing identifier information of adjacent cells of the first cell from another base station forming the first cell, and a transmitting step of transmitting the first adjacent cell information to the identifier assignment device.

In an exemplary aspect of the invention, a non-transitory computer readable medium stores a program causing a computer to execute a step of transmitting first adjacent cell information containing identifier information of adjacent cells of a first cell formed by a first base station to a second base station that forms a second cell, and a step of transmitting the first adjacent cell information received by the second base station to an identifier assignment device that assigns an identifier of the second cell.

The above and other objects, features and advantages of the present invention will become more fully understood from the detailed description given hereinbelow and the accompanying drawings which are given by way of illustration only, and thus are not to be considered as limiting the present invention.

BRIEF DESCRIPTION OF THE DRAWINGS

FIG. 8 is a diagram showing a structure of an IE contained in an X2 setup request message.

FIG. 9 is a diagram showing a structure of an IE contained in an X2 setup response message.

FIG. 10 is a diagram showing a structure of an IE contained in an ENB configuration update message.

FIG. 15 is a diagram showing a list of PCIs and EGCIs of cells adjacent to cells adjacent to adjacent cells of a cell to which a PCI is assigned according to a third exemplary embodiment of the present invention;

EXEMPLARY EMBODIMENT

Exemplary embodiments of the present invention are described hereinafter with reference to the drawings. The exemplary embodiments, however, do not limit the scope of the present invention.

First Exemplary Embodiment

A communication system according to the first exemplary embodiment of the present invention is described hereinafter with reference to FIG. 1.

A communication system 10 according to this exemplary embodiment includes a first base station 11, a second base station 12, and an identifier assignment device 13.

The first base station 11 forms a first cell. The second base station 12 forms a second cell. The identifier assignment device 13 assigns an identifier of the second cell.

The first base station 11 transmits first adjacent (neighbor) cell information containing identifier information of adjacent (neighbor) cells of the first cell to the second base station 12. Further, the second base station 12 transmits the first adjacent cell information received from the first base station 11 to the identifier assignment device 13.

The configuration of each of the second base station 12 and the identifier assignment device 13 is described hereinafter with reference to FIGS. 2 and 3.

Figure 2:
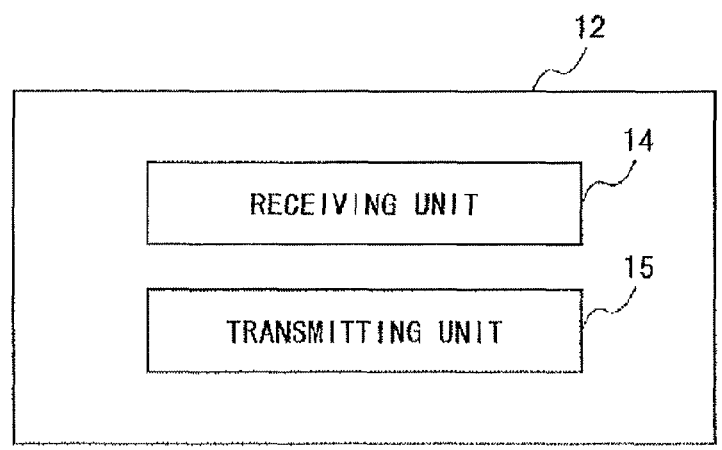
FIG. 2 is a block diagram showing a configuration of a second base station according to the first exemplary embodiment of the present invention.

FIG. 2 shows a configuration of the second base station 12. The second base station 12 includes a receiving unit 14 and a transmitting unit 15. The receiving unit 14 receives the first adjacent cell information transmitted from the first base station 11. The transmitting unit 15 transmits the first adjacent cell information received by the receiving unit 14 to the identifier assignment device 13.

Figure 3:
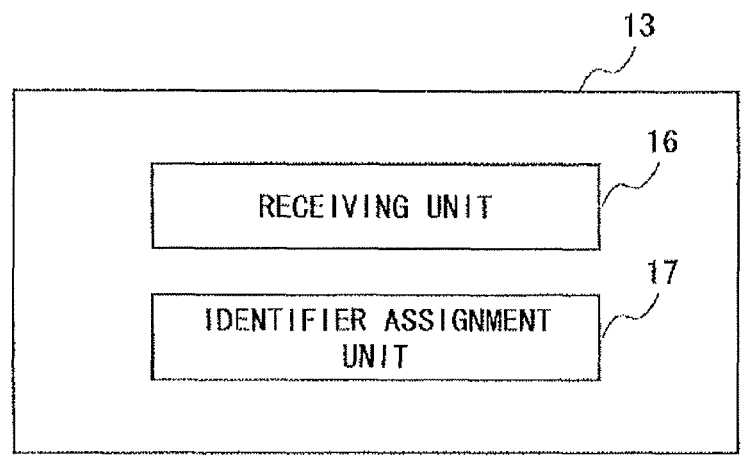
FIG. 3 is a block diagram showing a configuration of an identifier assignment device according to the first exemplary embodiment of the present invention.

FIG. 3 shows a configuration of the identifier assignment device 13. The identifier assignment device 13 includes a receiving unit 16 and an identifier assignment unit 17. The receiving unit 16 receives the first adjacent cell information transmitted from the second base station 12. The identifier assignment unit 17 assigns an identifier of the second cell based on the first adjacent cell information received by the receiving unit 16.

Figure 4:
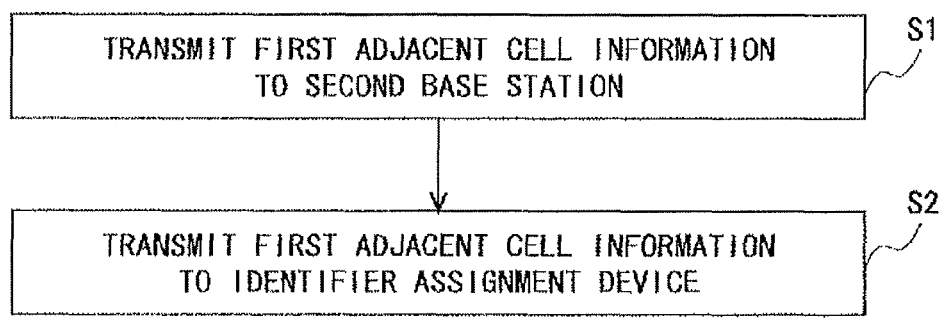
FIG. 4 is a flowchart illustrating an operation of the communication system according to the first exemplary embodiment of the present invention.

A communication method in the communication system 10 according to this exemplary embodiment is described hereinafter with reference to FIG. 4. First, the first adjacent cell information is transmitted to the second base station 12 (Step S1).

Next, the first adjacent cell information received by the second base station 12 is transmitted to the identifier assignment device 13 (Step S2).

In the above manner, in the communication system 10 according to this exemplary embodiment, the identifier assignment device 13 can know the identifier information of adjacent cells of a cell formed by the first base station 11 even when the identifier assignment device 13 and the first base station 11 are not directly connected.

Therefore, the identifier assignment device 13 according to this exemplary embodiment can assign an identifier that is likely to maintain collision-free and confusion-free even when radio environment changes.

Particularly, in the case where adjacent cells of at least one of the first cell and the second cell include the other cell, the possibility to maintain collision-free and confusion-free increases as a result that the identifier assignment device 13 obtains the first adjacent cell information. However, there is a case where the first cell and the second cell are not adjacent to each other but are close to each other. In such a case also, the possibility to maintain collision-free and confusion-free increases even when radio environment changes can increase in some cases as a result that the identifier assignment device 13 obtains the first adjacent cell information. For example, in the case where adjacent cells of a third cell, which is the adjacent cell of the second cell, include the first cell, the possibility to maintain collision-free and confusion-free can increase as a result that the identifier assignment device 13 uses the first adjacent cell information as in Step S32 of a third exemplary embodiment, which is described later.

Second Exemplary Embodiment

A communication system 20 according to the second exemplary embodiment of the present invention is described hereinafter with reference to FIG. 5.

The communication system 20 according to this exemplary embodiment is an LTE (Long Term Evolution) system having a centralized SON (Self-Organizing Network) function. The "centralized SON" means that a SON functional unit exists in an OAM (Operation Administration and Maintenance) System. The operation performed by the SON functional unit includes self-configuration, self-optimization, self-healing and the like, and, specifically, determination of a PCI, for example. Further, the centralized SON includes NM-centralized SON where NMS (Network Management System) has the SON function and EM-centralized SON where EMS (Element Management System) has the SON function. It is assumed that the communication system 20 according to this exemplary embodiment is the EM-centralized SON. Note that the NMS is a management system that manages the entire LTE network. The EMS is a management system that manages a plurality of base stations (eNB etc.).

The communication system 20 according to this exemplary embodiment includes an NMS 21, EMSs 22 and 23, eNBs $24_{1\sim m}$, and cells $25_{1\sim m}$. The NMS 21 manages the entire communication system 20. The EMS 22 manages the eNBs $24_{1\sim n}$. The EMS 23 manages the eNBs $24_{n+1\sim m}$. The eNBs $24_{1\sim m}$ are base stations and form the cells $25_{1\sim m}$, respectively. Note that, although one eNB can form a plurality of cells, it is assumed in this exemplary embodiment that each eNB forms a single cell to simplify the description. Thus, the eNBs $24_{1\sim m}$ form the cells $25_{1\sim m}$, respectively.

The NMS 21 is connected to the EMS 22 and the EMS 23 through a given interface. The EMS 22 is connected to the eNBs $24_{1\sim n}$ through a given interface. Likewise, the EMS 23 is connected to the eNBs $24_{n+1\sim m}$ through a given interface.

The EMSs 22 and 23 have SON functional units 26 and 27, respectively. In this exemplary embodiment, the EMSs 22 and 23 function as identifier assignment devices.

Figure 6:
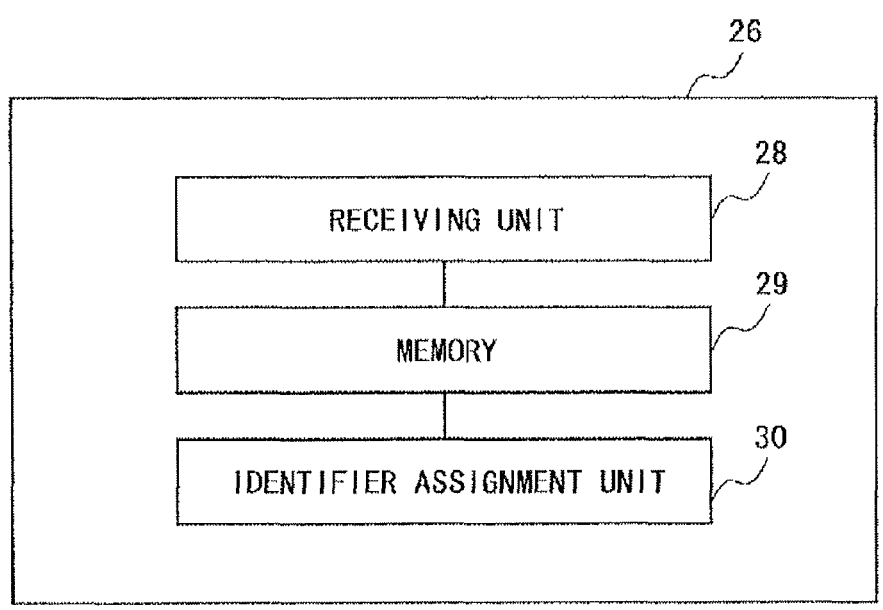
FIG. 6 is a block diagram showing a configuration of a SON functional unit according to the second exemplary embodiment of the present invention.

FIG. 6 shows a configuration of the SON functional unit 26. Note that the configuration of the SON functional unit 27 is the same as that of the SON functional unit 26 and thus not repeatedly described.

As shown in FIG. 6, the SON functional unit 26 includes a receiving unit 28, a memory 29, and an identifier assignment unit 30. The receiving unit 28 receives neighbour information. The memory 29 stores the received neighbour information. The identifier assignment unit 30 assigns an identifier to a cell formed by an eNB connected to the EMS 22. The identifier assigned to a cell includes a PCI.

Note that the neighbour information is information containing identifier information of an adjacent cell. Further, the adjacent cell means a cell to which handover can be made by a mobile terminal, and it includes a cell with which a cover area overlaps. For example, assuming that cells to which handover can be made from the cell $25_1$ by a mobile terminal are the cell $25_2$, the cell $25_9$ and the cell $25_{10}$. In this case, adjacent cells of the cell $25_1$ are the cell $25_2$, the cell $25_9$ and the cell $25_{10}$.

Figure 7:
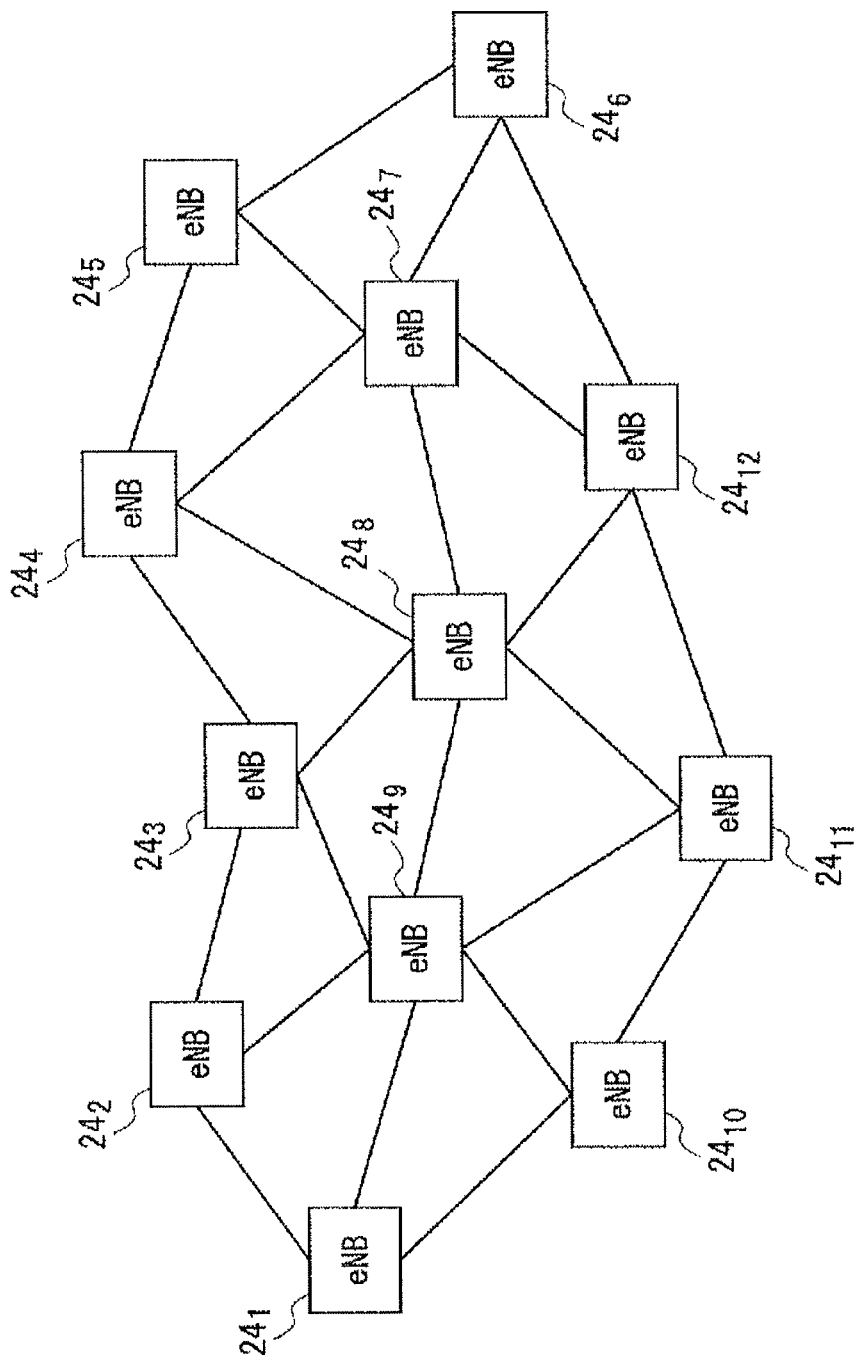
FIG. 7 is a diagram showing an X2 interface established between eNBs according to the second exemplary embodiment of the present invention.

Further, the eNBs $24_{1\sim m}$ can establish an X2 interface with another eNB. The X2 interface is an interface specified by the 3GPP (3rd Generation Partnership Project) standard. Typically, the X2 interface is often established between eNBs that form adjacent cells. In this exemplary embodiment, the X2 interface is established between eNBs connected by a solid line as shown in FIG. 7. Note that FIG. 7 shows the configuration in the case of m=12, that is, the communication system 20 includes eNBs $24_{1\sim 12}$.

The eNBs that are connected to each other through the X2 interface can transmit and receive neighbour information of the cell formed by themselves by transmitting and receiving a message. The message transmitted and received by the eNBs is an X2 setup request message, an X2 setup response message, or an ENB configuration update message. The X2 setup request message and the X2 setup response message are messages transmitted and received at the time of newly establishing the X2 interface between eNBs. The ENB configuration update message is a message transmitted and received between eNBs when an information element such as the neighbour information is changed. FIGS. 8 to 10 show IE (Information Element) contained in each message. As shown in FIGS. 8 to 10, the neighbour information is composed of a list containing a combination of ECGI (E-UTRAN Cell Global Identifier), PCI, and EARFCN (E-UTRAN Absolute Radio Frequency Channel Number). The ECGI is an identifier that uniquely identifies a cell. The PCI is one of radio resources, and it is a physical cell identifier that is assigned to a cell. In the LTE, 504 different PCIs, from 0 to 503, are used. The EARFCN is one of radio resources, and it corresponds to a frequency used by a cell.

Figure 11:
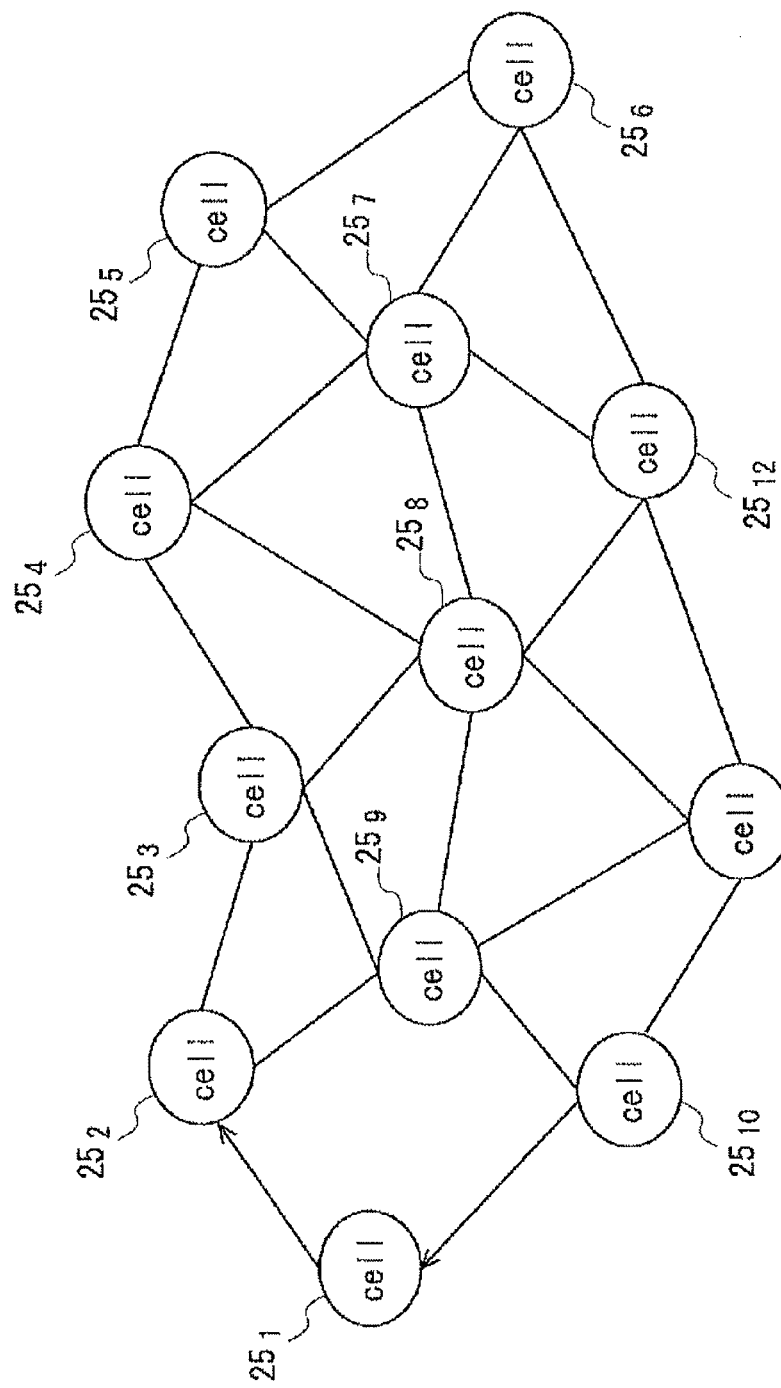
FIG. 11 is a diagram showing cell adjacent relation according to the second exemplary embodiment of the present invention.

FIG. 11 shows the adjacent relation of cells $25_{1\sim 12}$ formed by the eNBs $24_{1\sim 12}$. In FIG. 11, cells connected by a solid line with no arrow mean that they are adjacent cells that are adjacent to each other. Accordingly, the neighbour information of one cell contains the identifier information of the other cell. Cells connected by a solid line with an arrow mean that adjacent cells of the cell from which the arrow starts include the cell to which the arrow is pointing but adjacent cells of the cell to which the arrow is pointing do not include the cell from which the arrow starts. Accordingly, the neighbour information of the cell from which the arrow starts contains the identifier information of the cell to which the arrow is pointing. On the other hand, the neighbour information of the cell to which the arrow is pointing does not contain the identifier information of the cell from which the arrow starts. In other words, the neighbour information of one cell does not contain the identifier information of the other cell.

The ECGI, PCI and EARFCN are assigned to each of the cells $25_{1\sim12}$. The ECGIs assigned to the cells $25_{1\sim12}$ are $ECGI_{1\sim12}$, respectively. Because the ECGI is an identifier unique to a cell, the $ECGI_{1\sim12}$ are different from one another. On the other hand, the EARFCNs assigned to the cells $25_{1\sim12}$ are all common. Further, the PCIs assigned to the cells $25_{1\sim12}$ are $PCI_{1\sim12}$, respectively. Although the same PCI value can be assigned to a plurality of cells, the PCI needs to be collision-free and confusion-free.

The collision-free means that the PCI of an area covered by a cell is one, that is, the areas covered by cells having the same PCI do not overlap. In this exemplary embodiment, when a combination of EARFCN and PCI of a certain cell is different from a combination of EARFCN and PCI of a cell contained in the neighbour information of that cell, collision-free is achieved.

The confusion-free means that adjacent cells of a certain cell do not include a plurality of cells having the same PCI. In this exemplary embodiment, when the neighbour information of a certain cell does not contain two or more cells having the same EARFCN and the same PCI, confusion-free is achieved.

The operation of the communication system 20 according to this exemplary embodiment is described hereinafter. The case of assigning a PCI to the cell $25_1$ formed by the eNB $24_1$ is described in this example.

Figure 12:
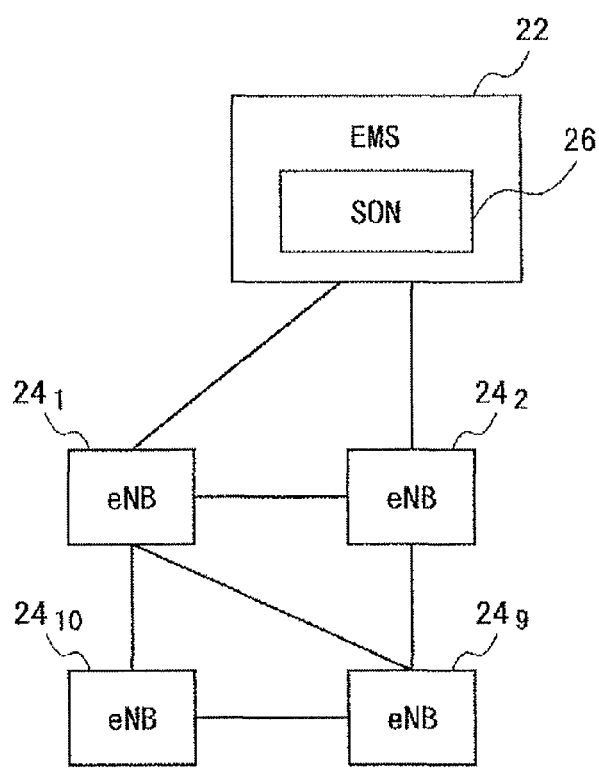
FIG. 12 is a block diagram showing a configuration of a part of the communication system according to the second exemplary embodiment of the present invention.

FIG. 12 shows the relation of the EMS 22 and the eNBs $24_{1,2,9,10}$ included in the communication system 20. As shown in FIG. 12, the eNB $24_1$ that forms the cell $25_1$ and the eNB $24_2$ that forms the cell $25_2$ are connected to the EMS 22 having the SON functional unit 26, and the eNB $24_9$ that forms the cell $25_9$ and the eNB $24_{10}$ that forms the cell $25_{10}$ are not connected to the EMS 22. Further, the X2 interface is established between the eNB $24_1$ and each of the eNB $24_2$, eNB $24_9$ and eNB $24_{10}$. Further, the X2 interface is established between the eNB $24_2$ and eNB $24_9$ and between the eNB $24_{10}$ and eNB $24_9$. See FIG. 11 for the adjacent relation of the cells. Referring to FIG. 11, adjacent cells of the cell $25_1$ are the cell $25_2$ and the cell $25_9$.

Figure 13:
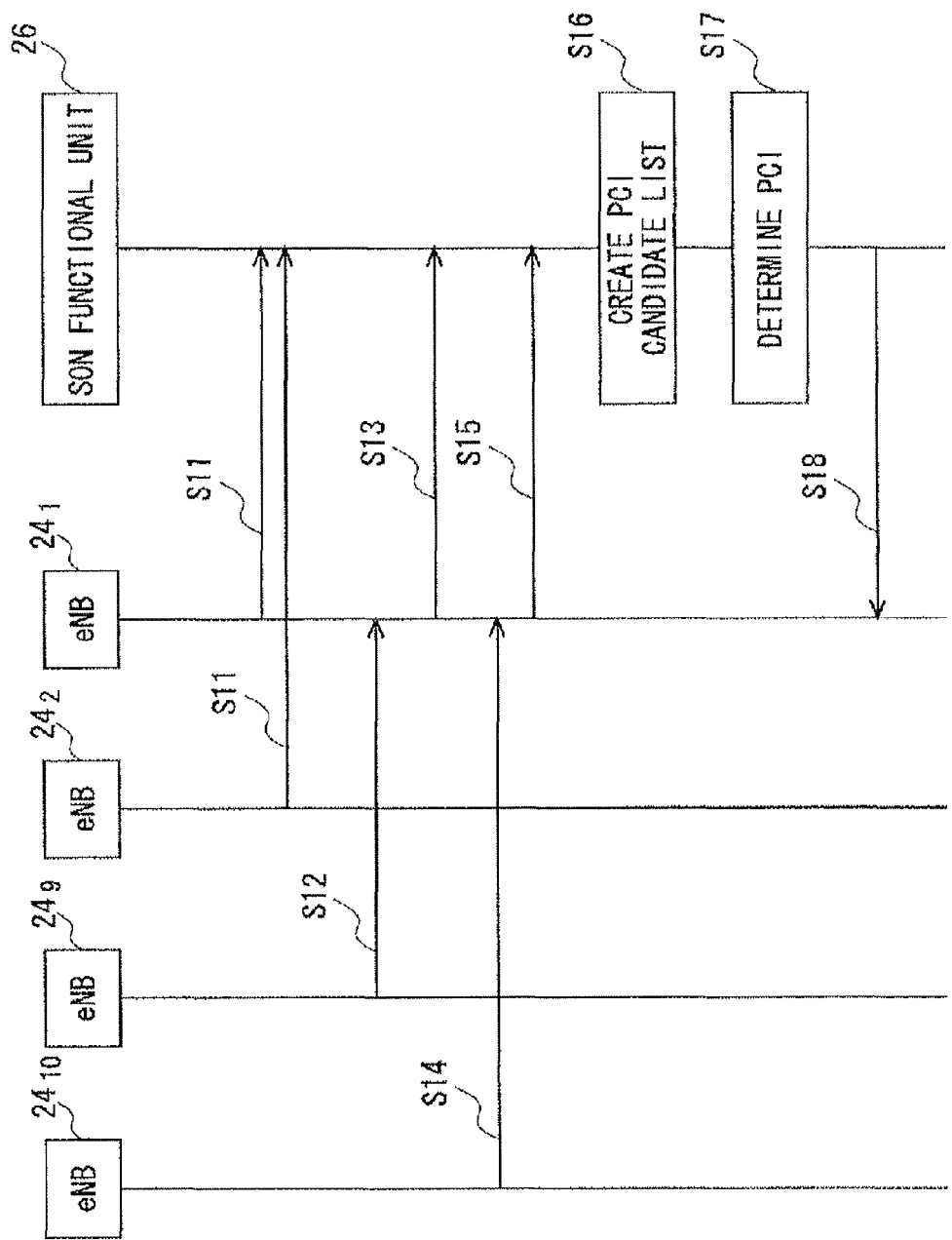
FIG. 13 is a diagram showing an example of an operation flow of the communication system according to the second exemplary embodiment of the present invention.
Figure 14:
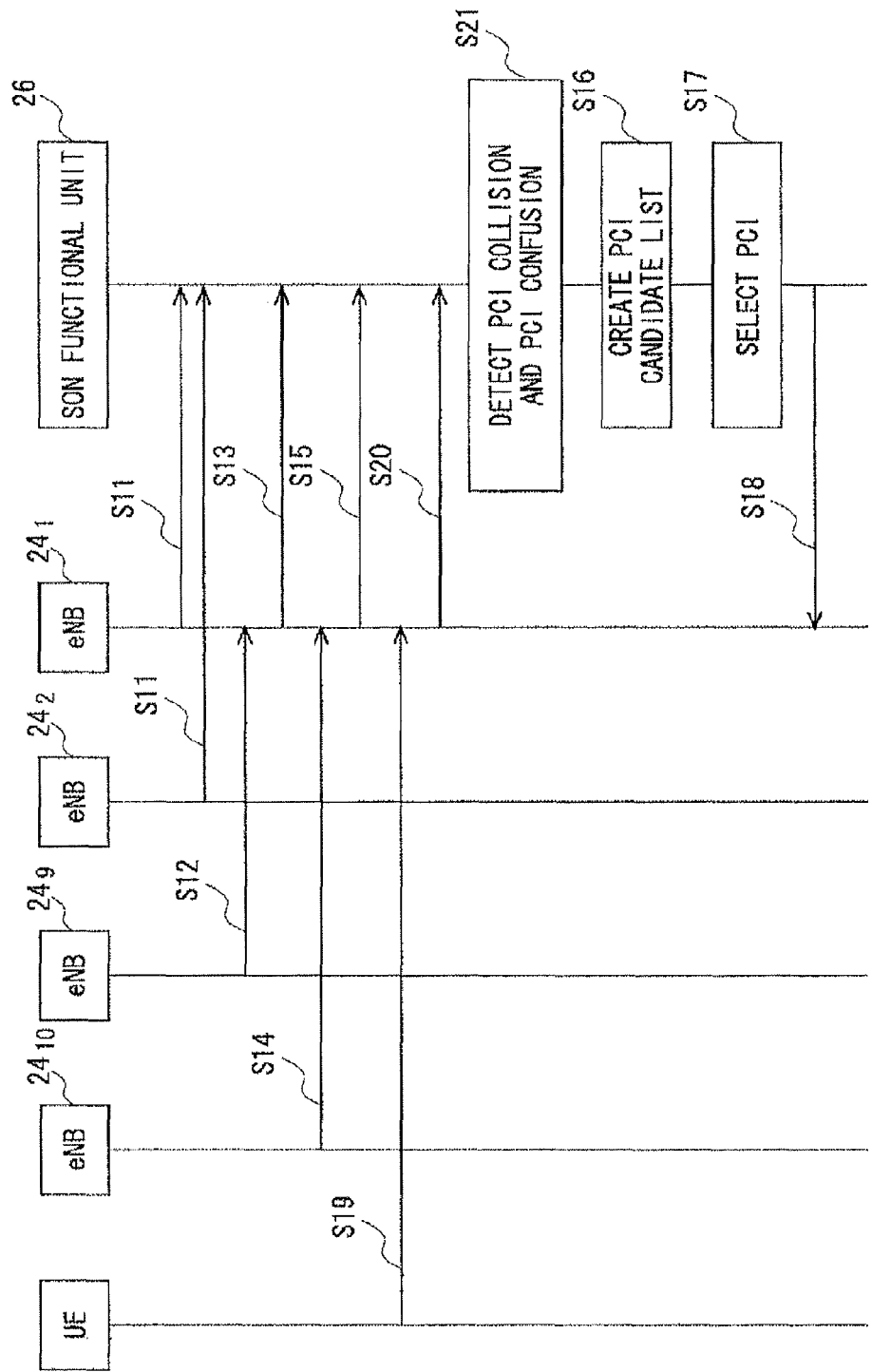
FIG. 14 is a diagram showing another example of an operation flow of the communication system according to the second exemplary embodiment of the present invention.
Figure 16:
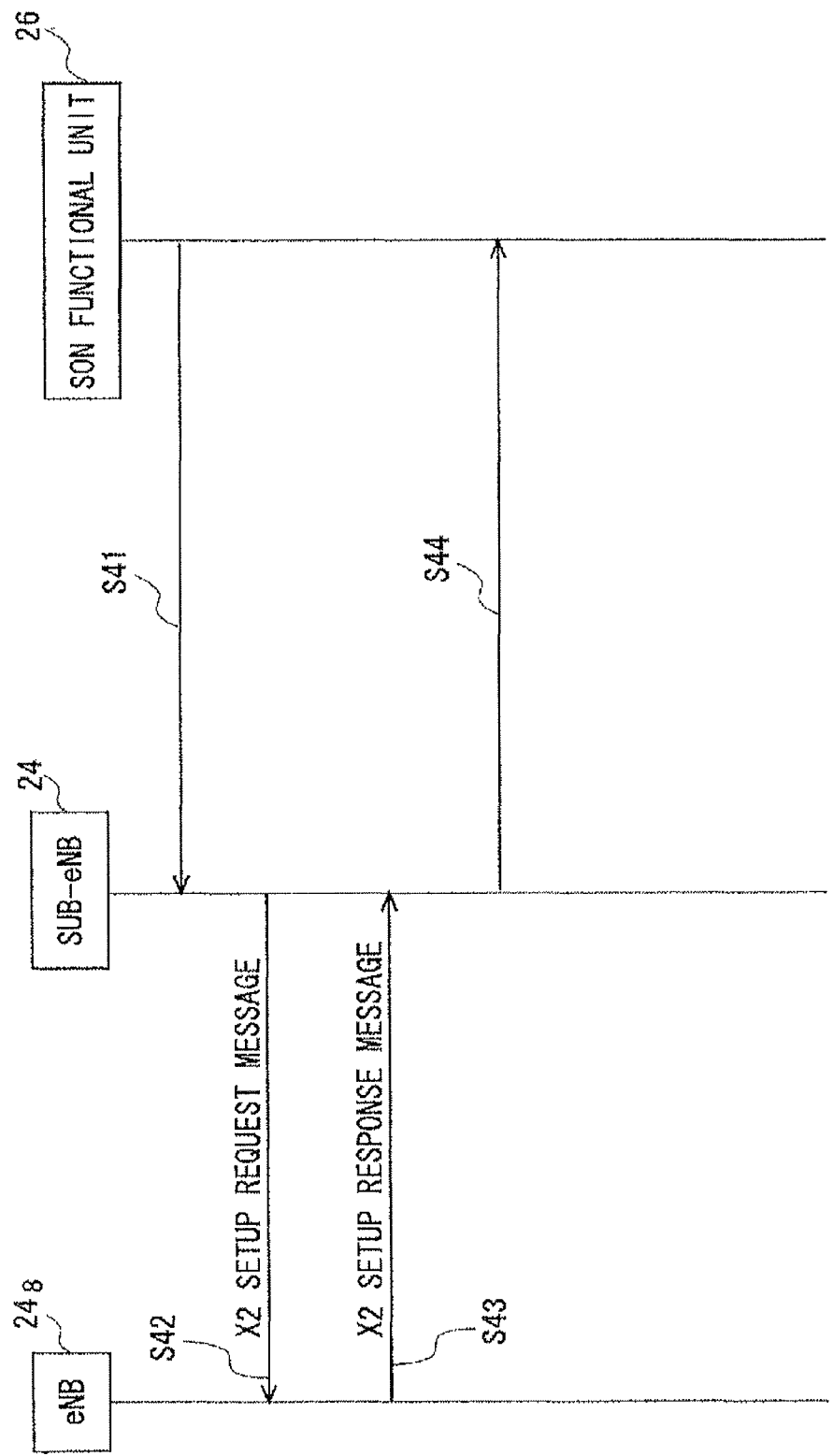
FIG. 16 is a diagram showing an example of an operation flow of the communication system according to the third exemplary embodiment of the present invention.

FIG. 13 shows an operation flow of the communication system 20. First, the eNB $24_1$ and the eNB $24_2$ transmit the neighbour information containing the identifier information of adjacent cells of the cell $25_1$ and the cell $25_2$ formed by themselves to the SON functional unit 26 (Step S11). The receiving unit 28 of the SON functional unit 26 receives the neighbour information of each of the cell $25_1$ and the cell $25_2$, and the memory 29 stores them. Note that, although the neighbour information of the cell $25_1$ and the cell $25_2$ are first transmitted to the SON functional unit 26, this operation may be performed at some point between Step S12 and Step S16, which are described later.

The eNB $24_9$ transmits the neighbour information containing the identifier information of adjacent cells of the cell $25_9$ formed by itself to the eNB $24_1$ (Step S12). For example, the eNB $24_9$ transmits the neighbour information of the cell $25_9$ to the eNB $24_1$ by adding it to the ENB configuration update message.

The eNB $24_1$ receives the neighbour information of the cell $25_9$ and then transmits the received neighbour information to the SON functional unit 26 (Step S13). The receiving unit 28 of the SON functional unit 26 receives the neighbour information of the cell $25_9$ received from the eNB $24_1$. Then, the memory 29 of the SON functional unit 26 stores the neighbour information of the cell $25_9$ received by the receiving unit 28.

Likewise, the neighbour information containing the identifier information of adjacent cells of the cell $25_{10}$ is transmitted to the SON functional unit 26 through the eNB $24_1$ (Steps S14, S15). Note that, because the eNB $24_{10}$ is connected also to the eNB $24_2$ through the X2 interface, the neighbour information of the cell $25_{10}$ may be transmitted to the SON functional unit 26 through the eNB $24_2$.

In the above manner, the SON functional unit 26 can store not only the neighbour information of the cell $25_1$ and the cell $25_2$ formed by the eNB $24_1$ and the eNB $24_2$ that are connected to the EMS 22 but also the neighbour information of the cell $25_9$ and the cell $25_{10}$ formed by the eNB $24_9$ and the eNB $24_{10}$ that are not connected to the EMS 22.

In the event it becomes necessary to assign a PCI to the cell $25_1$, the identifier assignment unit 30 of the SON functional unit 26 creates a PCI candidate list of the cell $25_1$ (Step S16). Note that a procedure to create the PCI candidate list of the cell $25_1$ by the identifier assignment unit 30 is described later.

Next, the identifier assignment unit 30 determines a PCI to be assigned to the cell $25_1$ from the PCI candidate list created in Step S16 (Step S17). The identifier assignment unit 30 then notifies the selected PCI to the eNB $24_1$ to make PCI assignment to the cell $25_1$ (Step S18).

The procedure to create the PCI candidate list of the cell $25_1$ by the identifier assignment unit 30 in Step S16 is described hereinafter.

First, the identifier assignment unit 30 creates a first PCI candidate list (Step S22). The first PCI candidate list is a list of all PCIs that can be assigned (for example, $PCI_{0\ to\ 503}$).

Next, the identifier assignment unit 30 excludes the PCIs of adjacent cells of the cell $25_1$ from the PCI candidate list (Step S23). Specifically, the identifier assignment unit 30 reads the neighbour information of the cell $25_1$ stored in the memory 29. The neighbour information of the cell $25_1$ contains ECGI information and PCI information of the cell $25_2$ and the cell $25_9$, which are the adjacent cells of the cell $25_1$. Then, the identifier assignment unit 30 creates a second PCI candidate list by excluding $PCI_2$ and $PCI_9$, which are the PCIs of the cell $25_2$ and the cell $25_9$, from the first PCI candidate list.

Then, the identifier assignment unit 30 excludes the PCIs of cells whose adjacent cells include the cell $25_1$ from the PCI candidate list (Step S24). Specifically, the identifier assignment unit 30 reads neighbour information of a plurality of cells stored in the memory 29 and determines that the cells whose neighbour information contains the identifier information of the cell $25_1$ are the cell $25_9$ and the cell $25_{10}$. The identifier assignment unit 30 then creates a third PCI candidate list by excluding the $PCI_9$ and $PCI_{10}$, which are the PCIs of the cell $25_9$ and the cell $25_{10}$, from the second PCI candidate list.

Then, the identifier assignment unit 30 excludes the PCIs of adjacent cells of the cells whose adjacent cells include the cell $25_1$ from the PCI candidate list (Step S25). Specifically, the identifier assignment unit 30 reads the neighbour information of the $PCI_9$ and $PCI_{10}$ whose adjacent cells include the cell $25_1$ from the memory 29. The adjacent cells of the cell $25_9$ are the cell $25_1$, the cell $25_2$, the cell $25_3$, the cell $25_8$, the cell $25_{10}$ and the cell $25_{11}$. Further, the adjacent cells of the cell $25_{10}$ are the cell $25_1$, the cell $25_9$ and the cell $25_{11}$. Thus, the identifier assignment unit 30 creates a fourth PCI candidate list by excluding $PCI_2$, $PCI_3$, $PCI_8$, $PCI_9$, $PCI_{10}$ the $PCI_{11}$, which are the PCIs of those adjacent cells, from the third PCI candidate list. Note that, because $PCI_1$ is the PCI of the cell $25_1$ itself, there is no need to exclude the $PCI_1$ from the PCI candidate list.

In the above manner, the identifier assignment unit 30 creates the candidate list for a PCI to be assigned to the cell $25_1$.

Then, in Step S17, the identifier assignment unit 30 selects a PCI to be assigned to the cell $25_1$ from the fourth PCI candidate list. Note that, when only one PCI remains in the PCI candidate list at some point of Steps S22 to S25, the PCI remaining in the PCI candidate list may be selected at that point and assigned to the cell $25_1$.

Note that, when, as a result of performing all of Steps S22 to S25, there remains no PCI in the PCI candidate list, the assignment of a PCI to the cell $25_1$ may be cancelled.

Note that, in Step S16, the PCI candidate list is created when it becomes necessary to assign a PCI to the cell $25_1$, and the case where it becomes necessary to assign a PCI is when PCI collision or PCI confusion is detected, when the need to change a PCI arises due to the occurrence of interference between cells, when an available PCI changes at operator's convenience or the like, for example. Note that PCI collision or PCI confusion may be detected by the SON functional unit 26 based on a measurement report transmitted from a mobile terminal (for example, UE: User Equipment). In this case, the UE that is communicating with the $eNB24_1$ transmits the measurement report to the $eNB24_1$ (Step S19). The $eNB24_1$ then transfers the measurement report received from the UE to the SON functional unit 26 (Step S20). Then, the SON functional unit 26 detects PCI collision and PCI confusion based on the received measurement report (Step S21).

In the above manner, the communication system 20 according to this exemplary embodiment performs PCI assignment to the cell $25_1$. In the fourth PCI candidate list, the PCIs of cells that are likely to have a cover area close to the cover area of the cell $25_1$, such as the PCIs of adjacent cells of the cell $25_1$, the PCIs of cells whose adjacent cells include the cell $25_1$, and the PCIs of adjacent cells of cells whose adjacent cells include the cell $25_1$, are excluded. Thus, a PCI different from the PCIs of cells that are likely to have a cover area close to the cover area of the cell $25_1$ is assigned to the cell $25_1$. Therefore, in the communication system 20 according to this exemplary embodiment, it is possible to assign a PCI that is likely to maintain collision-free and confusion-free without need for any work for measuring the radio environment or detailed information elements for estimating the radio environment.

Note that, although the identifier assignment unit 30 creates the PCI candidate list when it becomes necessary to assign a PCI to the cell $25_1$ in this exemplary embodiment, it is not limited thereto. For example, the PCI candidate list may be created or updated by executing the procedure of Steps S22 to S25 at regular time intervals. Alternatively, the PCI candidate list may be created or updated by executing the procedure of Steps S22 to S25 at the timing when the receiving unit 28 receives new neighbour information.

It should be noted that the PCI assignment in this exemplary embodiment is applicable to both the case of assigning a PCI again to a cell to which a PCI has been assigned and the case of assigning a PCI for the first time to a cell newly added to the communication system.

Third Exemplary Embodiment

The third exemplary embodiment of the present invention is described hereinafter. In this exemplary embodiment, a method for increasing the possibility to maintain collision-free and confusion-free by further modifying the PCI candidate list created in the second exemplary embodiment is described. Note that the configuration of the communication system according to this exemplary embodiment is the same as the configuration of the communication system 20 according to the second exemplary embodiment shown in FIGS. 5, 7, 11 and 12.

A procedure to create the PCI candidate list by the identifier assignment unit 30 in this exemplary embodiment is described hereinafter.

First, the operation in Steps S22 to S25 in the second exemplary embodiment is performed to thereby create the fourth PCI candidate list.

Next, the identifier assignment unit 30 excludes the PCIs of cells adjacent to the adjacent cells of the cell $25_1$ from the PCI candidate list (Step S31). Specifically, the identifier assignment unit 30 reads the neighbour information of the cell $25_2$ and the cell $25_9$, which are the adjacent cells of the cell $25_1$, from the memory 29. The adjacent cells of the cell $25_2$ are the cell $25_3$ and the cell $25_9$. Further, the adjacent cells of the cell $25_9$ are the cell $25_1$, the cell $25_2$, the cell $25_3$, the cell $25_8$, the cell $25_{10}$ and the cell $25_{11}$. Thus, the identifier assignment unit 30 creates a fifth PCI candidate list by excluding $PCI_2$, $PCI_3$, $PCI_8$, $PCI_9$, $PCI_{10}$ and $PCI_{11}$, which are the PCIs of the adjacent cells of the cell $25_2$ and the cell $25_9$, from the fourth PCI candidate list. Note that, because the $PCI_1$ is the PCI of the cell $25_1$ itself, there is no need to exclude the $PCI_1$ from the PCI candidate list.

Then, the identifier assignment unit 30 excludes the PCIs of cells adjacent to the cells adjacent to the adjacent cells of the cell $25_1$ from the PCI candidate list (Step S32). Specifically, the identifier assignment unit 30 reads the neighbour information of the cell $25_1$, the cell $25_2$, the cell $25_3$, the cell $25_8$, the cell $25_9$, the cell $25_{10}$ and the cell $25_{11}$, which are cells adjacent to the adjacent cells of the cell $25_2$ and the cell $25_9$, which are the adjacent cells of the cell $25_1$. FIG. 15 shows a list of PCIs and EGCIs contained in those neighbour information. Then, a sixth PCI candidate list is created by excluding the PCIs included in the list of FIG. 15 from the fifth PCI candidate list.

In the above manner, the identifier assignment unit 30 creates the candidate list for a PCI to be assigned to the cell $25_1$.

Then, the identifier assignment unit 30 assigns a PCI selected from the sixth PCI candidate list to the cell $25_1$ (Step S33). Note that, when no PCI remains in the PCI candidate list at some point of Steps S31 and S32, the PCI that has remained just before may be assigned to the cell $25_1$.

In the sixth PCI candidate list according to this exemplary embodiment, the PCIs of cells that are likely to have a cover area close to the cover area of the cell $25_1$, such as the PCIs of adjacent cells of the cell $25_1$, the PCIs of cells adjacent to the adjacent cells of the cell $25_1$, and the PCIs of cells adjacent to the cells adjacent to the adjacent cells of the cell $25_1$, are excluded. Thus, the identifier assignment unit 30 assigns a PCI different from the PCIs of cells that are likely to have a cover area close to the cover area of the cell $25_1$ to the cell $25_1$. Therefore, in this exemplary embodiment also, it is possible to assign a PCI that is likely to maintain collision-free and confusion-free even when radio environment changes.

Further, in this exemplary embodiment, Steps S31 and S32 are performed after Steps S23 to S25 in the second exemplary embodiment are performed; however, it is not limited thereto. Specifically, Steps S23 to S25 and Steps S31 and S32 may be performed in any order. Further, it is not necessary to perform all of Steps S23 to S25 and Steps S31 and S32. Specifically, the effect of increasing the possibility to maintain collision-free and confusion-free is obtained as long as some of Steps S23 to S25 and Steps S31 and S32 are performed.

Note that, in this exemplary embodiment, the PCIs of cells adjacent to cells adjacent to the adjacent cells of the cell $25_1$ are excluded from the PCI candidate list in Step S32. Thus, in addition to the neighbour information of the cell $25_1$, the cell $25_2$, the cell $25_9$ and the cell $25_{10}$ that are stored into the memory 29 in Steps S11 to S15, the neighbour information of the cell $25_3$, the cell $25_8$ and the cell $25_{11}$ are required. When the eNB $24_3$, the eNB $24_8$ and the eNB $24_{11}$ that respectively form the cell $25_3$, the cell $25_8$ and the cell $25_{11}$ are connected to the EMS 22, each eNB can directly notify the neighbour information of the cell formed by itself to the SON functional unit 26. On the other hand, even the eNB $24_3$, the eNB $24_8$ and the eNB $24_{11}$ are not connected to the EMS 22, if the X2 interface is established with another eNB that is connected to the EMS 22, each eNB can transmit the neighbour information of the cell formed by itself to the SON functional unit 26 through that another eNB.

Fourth Exemplary Embodiment

In the second and third exemplary embodiments, the neighbour information necessary for creating the PCI candidate list is stored in the memory 29 before the identifier assignment unit 30 creates the PCI candidate list. However, all of the neighbour information necessary for creating the PCI candidate list are not always collected at the point when the need for PCI assignment arises.

Further, in the second and third exemplary embodiments, the X2 interface is established at least between adjacent cells. However, in some communication systems, the X2 interface is not established even between adjacent cells. Further, there is a case where there is an eNB that is not connected to the EMS 22 including the SON functional unit 26 and that is not connected to any other eNBs connected to the EMS 22 through the X2 interface. Such an eNB cannot transmit neighbour information to the EMS 22 directly or through the X2 interface. This leads to the case where the neighbour information necessary for creating the PCI candidate list is not stored in the memory 29 of the SON functional unit 26.

In view of such a problem, a method for collecting neighbour information in the case where the SON functional unit 26 does not store the neighbour information necessary for creating the PCI candidate list is described in the fourth exemplary embodiment of the present invention.

It is assumed in this example that the neighbour information that is not stored in the SON functional unit 26 is the neighbour information of the cell $25_8$ formed by the eNB $24_8$.

First, the case where the EMS 22 including the SON functional unit 26 and the eNB $24_8$ are connected is described. In this case, the SON functional unit 26 requests the eNB $24_8$ to transmit neighbour information. Receiving the request from the SON functional unit 26, the eNB $24_8$ transmits the neighbour information of the cell $25_8$ formed by itself to the SON functional unit 26. The SON functional unit 26 can thereby collect the neighbour information of the cell $25_8$.

Next, the case where the eNB $24_3$ that establishes the X2 interface with the eNB $24_8$ is connected to the EMS 22 is described. In this case, the SON functional unit 26 requests the eNB $24_8$ to transmit neighbour information through the X2 interface between the eNB $24_3$ and the eNB $24_8$. Receiving the request, the eNB $24_8$ transmits the neighbour information of the cell $25_8$ formed by itself to the eNB $24_3$ through the X2 interface. Then, the eNB $24_3$ transmits the neighbour information of the cell $25_8$ to the SON functional unit 26. The SON functional unit 26 can thereby collect the neighbour information of the cell $25_8$.

Next, the case where any of eNBs that establish a communication channel with the eNB $24_8$ are not connected to the EMS 22 is described. In this case, the SON functional unit 26 requests any eNB (which is referred to hereinafter as a sub-eNB) of the eNBs connected to the EMS 22 to establish a communication channel (which is the X2 interface in this example) with the eNB $24_8$ (Step S41). When the sub-eNB that has received the request from the SON functional unit 26 knows the X2 TNL (Transport Network Layer) address of the eNB $24_8$, the sub-eNB operates as follows. Specifically, the sub-eNB establishes an SCTP interface with the eNB $24_8$ and then transmits an X2 setup request message to the eNB $24_8$ (Step S42). The eNB $24_8$ then transmits an X2 setup response message to the sub-eNB (Step S43). In this step, the eNB $24_8$ adds the neighbour information of the cell $25_8$ to the X2 setup response message. The sub-eNB then transmits the received neighbour information of the cell $25_8$ to the SON functional unit 26 (Step S44). The SON functional unit 26 can thereby collect the neighbour information of the cell $25_8$.

On the other hand, when the sub-eNB that has received the request from the SON functional unit 26 does not know the X2 TNL address of the eNB $24_8$, the sub-eNB operates as follows. Specifically, the sub-eNB acquires the X2 TNL address of the eNB $24_8$ by using the S1 interface. The sub-eNB can thereby perform the operation of Step S42 and the subsequent steps.

Finally, the case where the eNB $24_8$ is connected to the SON functional unit 26 of the EMS 23 that is connected to the EMS 22 is described. Note that the EMS 22 may be connected to the EMS 23 though not shown in FIG. 5. In this case, when the SON functional unit 27 stores the neighbour information of the cell $25_8$, the SON functional unit 26 can collect the neighbour information of the cell $25_8$ from the SON functional unit 27. On the other hand, when the SON functional unit 27 does not store the neighbour information of the cell $25_8$, the SON functional unit 26 requests the eNB $24_8$ to transmit the neighbour information of the cell $25_8$ to the SON functional unit 27 through the SON functional unit 27. Then, the SON functional unit 27 transmits the neighbour information of the cell $25_8$ transmitted from the eNB $24_8$ to the SON functional unit 26. The SON functional unit 26 can thereby collect the neighbour information of the cell $25_8$.

Note that the timing when the SON functional unit 26 makes a request for collecting the neighbour information of the cell $25_8$ may be just before or during the creation of the PCI candidate list. Alternatively, it may be the point of time when it is estimated or detected that the cover area of another cell and the cover area of the cell $25_8$ are close to each other.

In the above manner, the SON functional unit 26 can collect the neighbour information required for creating the PCI candidate list. Therefore, it is possible to exclude the PCIs of other cells that are likely to have a cover area close to the cover area of the cell from the candidate list for a PCI to be assigned to the cell. It is thereby possible to increase the possibility to maintain collision-free and confusion-free in the PCI assignment.

Although preferred exemplary embodiments of the present invention are explained in detail in the foregoing, the present invention is not limited thereto, and various changes may be made without departing from the scope of the invention.

For example, although the PCI candidate list is created using neighbour information in the first to fourth exemplary embodiments, other information may be used as well. For example, the SON functional unit may also collect position information (for example, latitude and longitude) of an eNB through the X2 interface. As the position information, GNSS (Global Navigation Satellite System(s)) may be used, for example. Note that the position information may be transmitted and received at the same timing as the neighbour information. For example, information of the GNSS may be added, together with the neighbour information, to the X2 setup request message, the X2 setup response message, the ENB configuration update message or the like. Alternatively, the position information may be transmitted and received at different timing from the neighbour information.

The SON functional unit may determine a cell whose cover area is close more accurately by referring to the received position information. Therefore, it is possible to exclude the PCI of a cell that is determined to have a nearby cover area from the PCI candidate list even if it is not an adjacent cell. Further, because a cell whose cover area is significantly close can be specified among adjacent cells, it is possible to set an order of priority for exclusion from the PCI candidate list. Consequently, it is possible to further increase the possibility to maintain collision-free and confusion-free in the PCI assignment.

Figure 17:
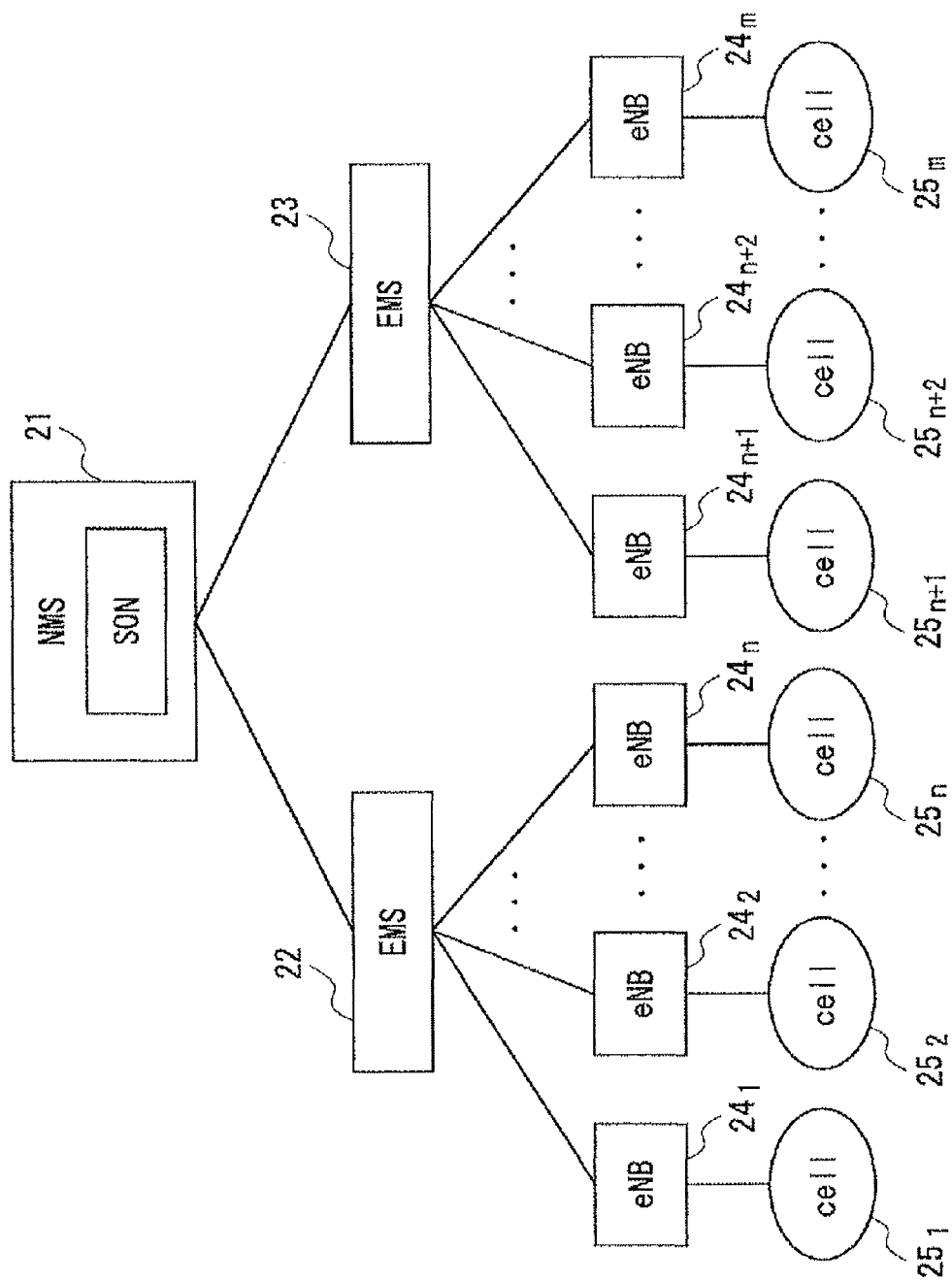
FIG. 17 is a block diagram showing an example of a configuration of a communication system according to the present invention.

Further, although the communication system 20 according to the second to fourth exemplary embodiments is EM-centralized SON in which the EMSs 22 and 23 include the SON functional unit, it is not limited thereto. For example, it may be NM-centralized SON in which the NMS 21 includes the SON functional unit as shown in FIG. 17. In this case, the SON functional unit of the NMS 21 receives neighbour information transmitted from each eNB through the EMS 22 or the EMS 23. Alternatively, the NMS 21 and the EMSs 22 and 23 each may include the SON functional unit.

Further, a core network device (for example, MME (Mobility Management Entity), gateway device etc.) in the core network may include the SON functional unit. In this case, the neighbour information of a cell formed by an eNB is acquired through the S1 interface. Further, in the communication system in which SGSN (Serving GPRS Support Node) is included in the core network, the SGSN may include the SON functional unit.

Note that the SON functional unit may be included in an O&M (Operations and Maintenance) functional unit that can communicate with a base station. For example, in the second exemplary embodiment, the EMS 22 may include the O&M functional unit, and the O&M functional unit may include the SON functional unit.

Figure 18:
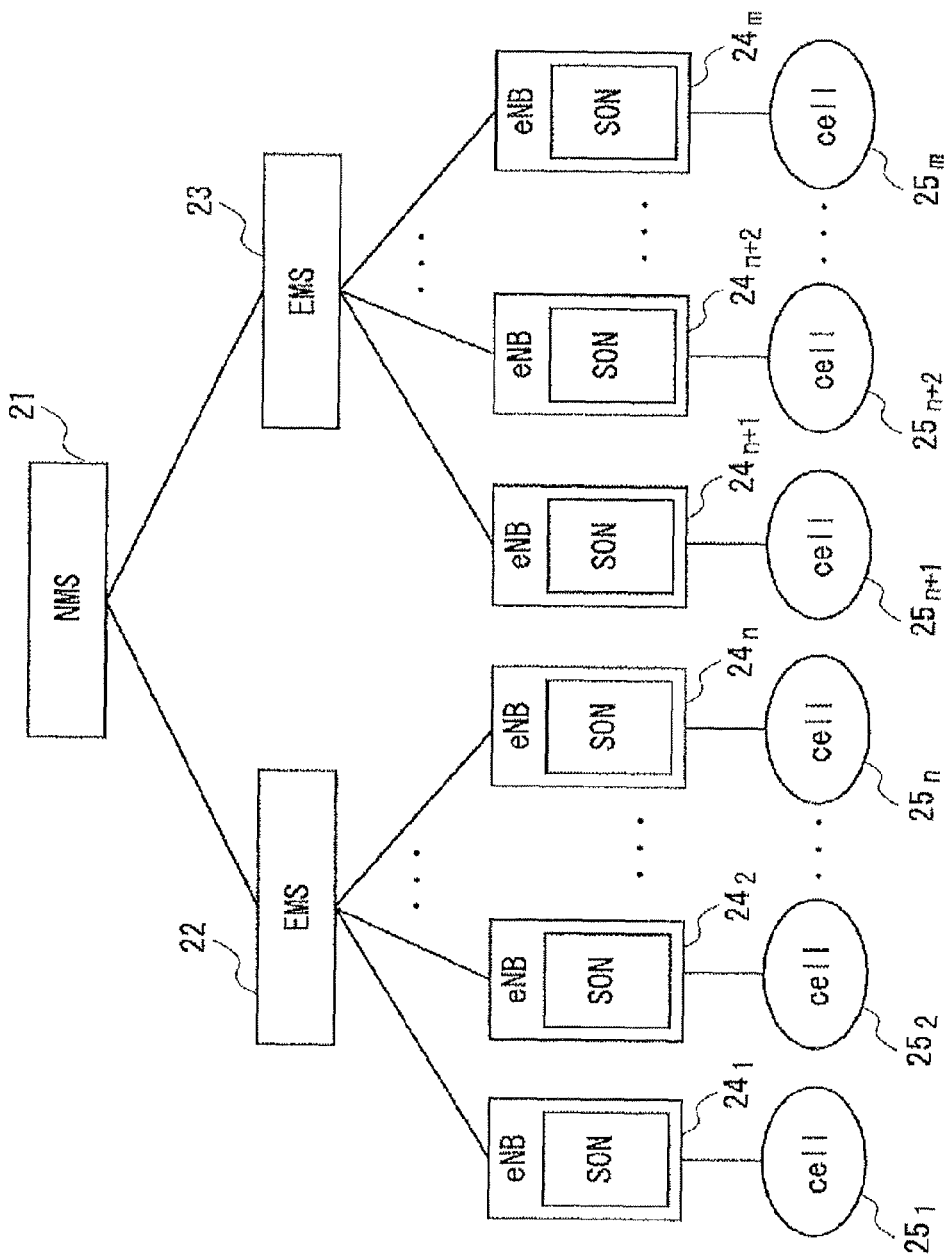
FIG. 18 is a block diagram showing an example of a configuration of a communication system according to the present invention.

Further, although the communication system 20 according to the second to fourth exemplary embodiments is the LTE system having the centralized SON function, it is not limited thereto. For example, the communication system 20 may be applied to the LTE system having the distributed SON function as shown in FIG. 18. The distributed SON function means that the SON functional unit exists in NE (Network Element) level (for example, eNB). In this case, the SON functional unit acquires the neighbour information of a cell formed by an eNB through the X2 interface. In the case of collecting the neighbour information of a cell formed by an eNB with which the X2 interface is not established, the X2 setup request message may be transmitted to a desired eNB in the same manner as described in the fourth exemplary embodiment. Then, the neighbour information may be added to the X2 setup response message in response to the X2 setup request message. The SON functional unit of the eNB can thereby collect the desired neighbour information.

Further, the communication system according to the first to fourth exemplary embodiments may be applied to a system other than the LTE system. Specifically, the communication system according to the present invention is applicable to any system which assigns an identifier to a cell and in which information containing identifiers of adjacent cells such as the neighbour information is available.

Further, in the present invention, a method of forming the neighbour information, which is, the way of determining the adjacent cell relation, is not particularly limited. For example, the SON functional unit may adjust the adjacent cell relation based on the report records of the measurement report transmitted from a mobile terminal. Alternatively, without using the SON function, adjacent cells of a cell formed by a base station may be determined on the basis of the cell layout or drive test results.

Figure 1:
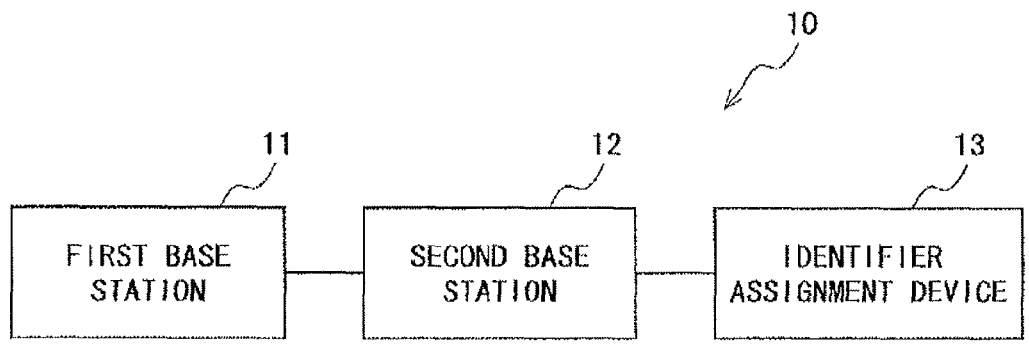
FIG. 1 is a block diagram showing a configuration of a communication system according to a first exemplary embodiment of the present invention.
Figure 5:
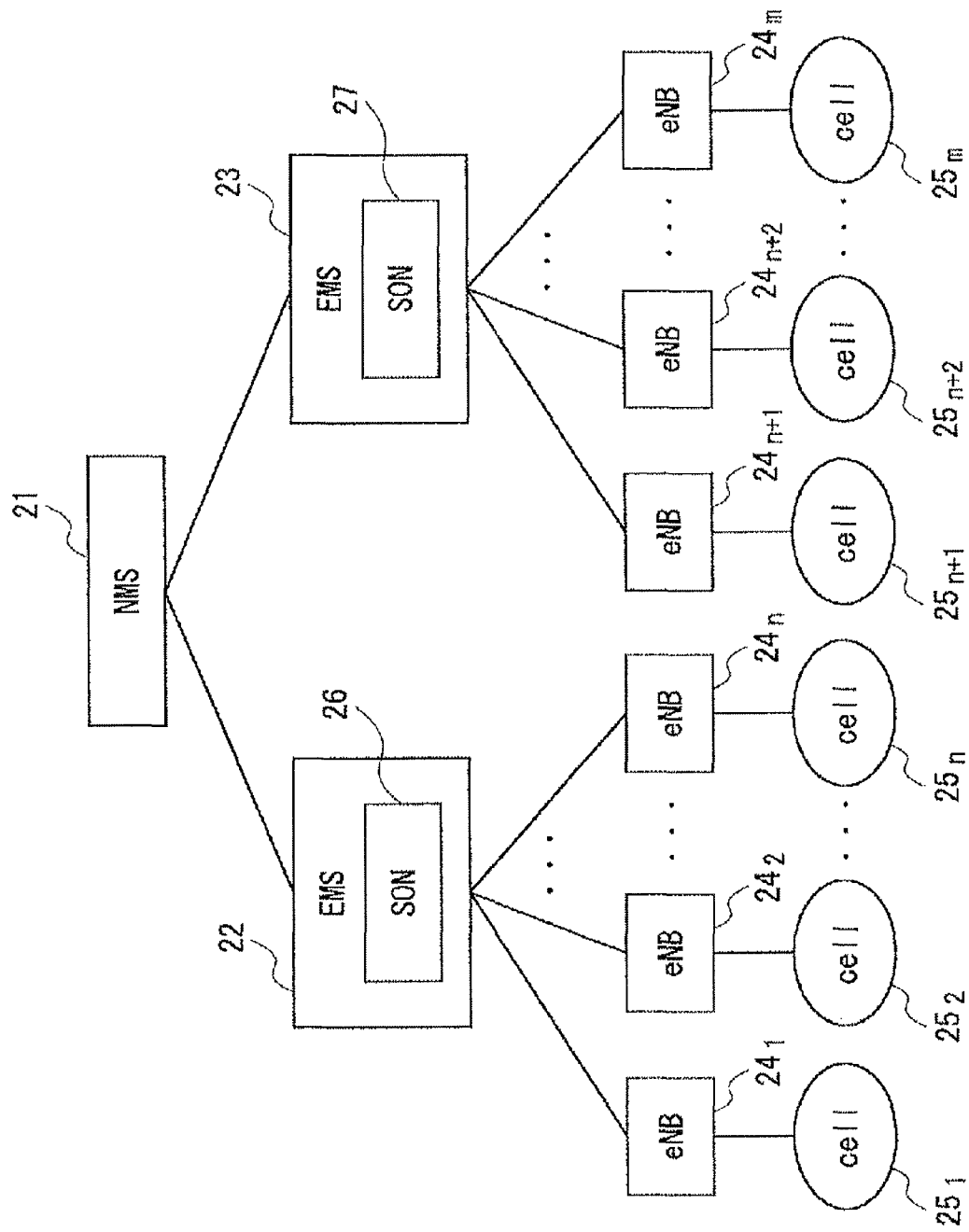
FIG. 5 is a block diagram showing a configuration of a communication system according to a second exemplary embodiment of the present invention.

Further, each operation of the communication system described in the first to fourth exemplary embodiments may be controlled by a CPU (Central Processing Unit) of a device included in the communication system shown in FIGS. 1 and 5 or another device that can communicate with the device. In this case, a storage medium storing program codes of software that implements the functions of each exemplary embodiment is prepared, and the CPU operates in accordance with the program codes stored in the storage medium and read by a general-purpose computer, thereby implementing the operation.

The program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

Further, the cell is a base unit of a service coverage, and it is called a sector cell when the service area of an eNB is divided by a sector antenna (antenna with directionality in a horizontal plane) or the like, and called an omni-cell when the service area is not divided (an omni-antenna with no directionality in a horizontal plane is used). Although the case of the omni-cell is described in the first to fourth exemplary embodiments of the present invention to simplify the description, the present invention may be applied equally to the sector cell.

Further, in the second to fourth exemplary embodiments, the type of a base station is not particularly limited. Specifically, the bases station may be any of a macro bases station that forms a macro cell, a pico base station that forms a pico cell, and a femto base station (HNB or HeNB) that forms a femto cell.

The whole or part of the exemplary embodiments disclosed above can be described as, but not limited to, the following supplementary notes.

(Supplementary Note 1)

A communication system comprising:
    a first base station that forms a first cell;
    a second base station that forms a second cell; and
    an identifier assignment device that assigns an identifier for identifying the second cell, wherein:

the first base station transmits first neighbor cell information, containing identifier information of a neighbor cell of the first cell, to the second base station; and the second base station transmits the first neighbor cell information, received from the first base station, to the identifier assignment device.

(Supplementary Note 2)

The communication system according to Supplementary note 1, wherein the identifier information received from the first base station identifies the second cell.

(Supplementary Note 3)

The communication system according to Supplementary note 1 or 2, wherein the assignment of the identifier of the second cell is based on the first neighbor cell information.

(Supplementary Note 4)

The communication system according to any one of Supplementary notes 1 to 3, further comprising
a third base station that forms a third cell; wherein:
the third cell is neighbor cell of the first cell, and
the identifier assignment of the an identifier of the second cell is based on third neighbor cell information containing identifier information of a neighbor cell of the third cell and on the first neighbor cell information.

(Supplementary Note 5)

The communication system according to any one of Supplementary notes 1 to 4, further comprising:
a fourth base station that forms a fourth cell included in a neighbor cell list of the second cell, wherein
when a communication channel is not established between the second base station and the fourth base station, the identifier assignment device requests the second base station to establish a communication channel between the second base station and the fourth base station.

(Supplementary Note 6)

The communication system according to any one of Supplementary notes 1 to 5, wherein the identifier is a PCI.

(Supplementary Note 7)

The communication system according to any one of Supplementary notes 1 to 6, wherein the first neighbor cell information is contained in an X2 setup request message transmitted from the first base station.

(Supplementary Note 8)

The communication system according to any one of Supplementary notes 1 to 6, wherein the first neighbor cell information is contained in an X2 setup response message transmitted from the first base station.

(Supplementary Note 9)

The communication system according to any one of Supplementary notes 1 to 6, wherein the first neighbor cell information is contained in an ENB configuration update message transmitted from the first base station.

(Supplementary Note 10)

The communication system according to any one of Supplementary notes 1 to 9, wherein a management system that manages an operation of the second base station functions as the identifier assignment device.

(Supplementary Note 11)

The communication system according to any one of Supplementary notes 1 to 9, wherein the second base station functions as the identifier assignment device.

(Supplementary Note 12)

The communication system according to any one of Supplementary notes 1 to 9, wherein a management system that manages the communication system functions as the identifier assignment device.

(Supplementary Note 13)

The communication system according to any one of Supplementary notes 1 to 12, wherein the first neighbor cell information further contains ECGI information and EARFCN information of neighbor cells of the first cell.

(Supplementary Note 14)

The communication system according to any one of Supplementary notes 1 to 13, wherein
the first base station transmits position information of the first base station, in addition to the first neighbor cell information, to the second base station, and
the second base station transmits the position information of the first base station received from the first base station to the identifier assignment device.

(Supplementary Note 15)

The communication system according to Supplementary note 14, wherein the identifier assignment device assigns an identifier of the second cell based on the first neighbor cell information and the position information.

(Supplementary Note 16)

The communication system according to Supplementary note 14 or 15, wherein the position information of the first base station is GNSS of the first base station.

(Supplementary Note 17)

An identifier assignment device in a communication system including a first base station forming a first cell and a second base station forming a second cell, the identifier assignment device assigning an identifier of the second cell, comprising:

a receiving unit that receives first neighbor cell information, containing identifier information of neighbor cells of the first cell, from the second base station; and an identifier assignment unit that assigns an identifier of the second cell based on the first neighbor cell information received by the receiving unit.

(Supplementary Note 18)

A base station in a communication system including a first cell, a second cell, and an identifier assignment device that assigns an identifier of the second cell, the base station forming the second cell, comprising:

a receiving unit that receives first neighbor cell information, containing identifier information of neighbor cells of the first cell, from another base station forming the first cell; and a transmitting unit that transmits the first neighbor cell information to the identifier assignment device (Supplementary Note 19)

An identifier assignment method comprising:

transmitting first neighbor cell information, containing identifier information of neighbor cells of a first cell formed by a first base station, to a second base station that forms a second cell; and transmitting the first neighbor cell information, received by the second base station, to an identifier assignment device that assigns an identifier of the second cell.

(Supplementary Note 20)

A method for an identifier assignment device in a communication system including a first base station forming a first cell and a second base station forming a second cell, the identifier assignment device assigning an identifier of the second cell, the method comprising:

receiving first neighbor cell information, containing identifier information of neighbor cells of the first cell, from the second base station; and assigning an identifier of the second cell based on the first neighbor cell information.

(Supplementary Note 21)

A method for a base station in a communication system including a first cell, a second cell, and an identifier assignment device that assigns an identifier of the second cell, the base station forming the second cell, the method comprising:

receiving first neighbor cell information, containing identifier information of neighbor cells of the first cell, from another base station forming the first cell; and transmitting the first neighbor cell information to the identifier assignment device.

(Supplementary Note 22)

A program causing a computer to execute:

transmitting first neighbor cell information containing identifier information of neighbor cells of a first cell formed by a first base station to a second base station that forms a second cell; and transmitting the first neighbor cell information received by the second base station to an identifier assignment device that assigns an identifier of the second cell.

(Supplementary Note 23)

A program for an identifier assignment device in a communication system including a first base station forming a first cell and a second base station forming a second cell, the identifier assignment device assigning an identifier of the second cell, the program causing a computer to execute:

receiving first neighbor cell information, containing identifier information of neighbor cells of the first cell, from the second base station; and assigning an identifier of the second cell based on the received first adjacent cell information received in the receiving step.

(Supplementary Note 24)

A program for a base station in a communication system including a first cell, a second cell, and an identifier assignment device that assigns an identifier of the second cell, the base station forming the second cell, the program causing a computer to execute:

receiving first neighbor cell information, containing identifier information of neighbor cells of the first cell, from another base station forming the first cell; and transmitting the first neighbor cell information to the identifier assignment device.

(Supplementary Note 25)

A computer readable information storage medium storing the program according to any one of Supplementary notes 22 to 24.

According to the exemplary embodiment of the present invention, an identifier assignment device can know identifier information of adjacent cells of a cell formed by a base station that is not connected to the identifier assignment device.

While the invention has been particularly shown and described with reference to exemplary embodiments thereof, the invention is not limited to these exemplary embodiments. It will be understood by those of ordinary skill in the art that various changes in form and details may be made therein without departing from the spirit and scope of the present invention as defined by the claims.

What is claimed is:

1. A communication system comprising:
a first base station that forms a first cell;
a second base station that forms a second cell; and
an identifier assignment device that is connected to the second base station and assigns an identifier for identifying the second cell, and is not connected to the first base station, wherein:

the first base station transmits first neighbor cell information, containing identifier information of a neighbor cell of the first, cell to the second base station; and the second base station transmits the first neighbor cell information, received from the first base station, to the identifier assignment device.

2. The communication system according to claim 1, wherein the identifier information received from the first base station identifies the second cell.

3. The communication system according to claim 1, wherein the assignment of the identifier of the second cell is based on the first neighbor cell information.

4. The communication system according to claim 1, further comprising a third base station that forms a third cell; wherein:

the third cell is a neighbor cell of the first cell, and the identifier assignment of the an identifier of the second cell is based on third neighbor cell information containing identifier information of a neighbor cell of the third cell and on the first neighbor cell information.

5. The communication system according to claim 1, further comprising:

a fourth base station that forms a fourth cell included in a neighbor cell list of the second cell, wherein when a communication channel is not established between the second base station and the fourth base station, the identifier assignment device requests the second base station to establish a communication channel between the second base station and the fourth base station.

6. An identifier assignment device in a communication system including a first base station forming a first cell and a second base station forming a second cell, the identifier assignment device assigning an identifier of the second cell, comprising:

a receiving unit that receives first neighbor cell information, containing identifier information of neighbor cells of the first cell, from the second base station; and an identifier assignment unit that is connected to the second base station and assigns an identifier of the second cell based on the first neighbor cell information received by the receiving unit, and is not connected to the first base station.

7. A base station in a communication system including a first cell, a second cell, and an identifier assignment device that is connected to the second base station and assigns an identifier of the second cell, and is not connected to the first base station, the base station forming the second cell, comprising:

a receiving unit that receives first neighbor cell information, containing identifier information of neighbor cells of the first cell, from another base station forming the first cell; and a transmitting unit that transmits the first neighbor cell information to the identifier assignment device.

8. An identifier assignment method comprising:

transmitting first neighborcell information, containing identifier information of neighborcells of a first cell formed by a first base station, to a second base station that forms a second cell; and transmitting the first neighbor cell information, received by the second base station, to an identifier assignment device that is connected to the second base station and assigns an identifier of the second cell, and is not connected to the first base station.

9. A method for an identifier assignment device in a communication system including a first base station forming a first cell and a second base station forming a second cell, the identifier assignment device being connected to the second base station and assigning an identifier of the second cell, and not being connected to the first base station, the method comprising:
- receiving first neighbor cell information, containing identifier information of neighbor cells of the first cell, from the second base station; and
- assigning an identifier of the second cell based on the received first neighbor cell information.

10. A non-transitory computer readable medium embodying instructions for controlling a device to implement an identifier assignment method comprising:
- transmitting first neighbor cell information containing identifier information of neighbor cells of a first cell formed by a first base station to a second base station that forms a second cell; and
- transmitting the first neighbor cell information received by the second base station to an identifier assignment device that is connected to the second base station and assigns an identifier of the second cell, and is not connected to the first base station.

* * * * *